United States Patent Office 3,236,627 Patented Feb. 22, 1966

3,236,627

DISPERSANT COMPOSITIONS AND TOXICANT CONCENTRATES CONTAINING THE SAME

Paul L. Lindner, Evanston, Ill., assignor to Witco Chemical Company, Inc., New York, N.Y., a corporation of Delaware No Drawing. Filed Mar. 20, 1961, Ser. No. 96,661
14 Claims. (Cl. 71—3)

My invention relates to the production of new and useful dispersant compositions and to liquid biocidal toxicant compositions, particularly in the form of toxicant concentrates, containing said dispersants.

It has been found to be highly desirable, in certain situations, to be able to apply to an earth soil, in which plant or vegetable life is grown or contemplated to be grown, both water-soluble fertilizer material and also a desired pesticide, to wit, water-insoluble organic solvent-soluble insecticide, weed killer, or soil fumigant, hereafter generically called biocidal toxicant, in the form of a single compositions. Efforts to provide such a composition, for instance, in the form of a stable, mobile, pourable or pumpable liquid emulsion, by simple mixing, present certain serious problems. The water-soluble fertilizer materials comprise water-soluble compounds, typical examples of which are potassium chloride, potassium nitrate, ammonium nitrate, ammonium sulphate, potassium sulphate, ammonium phosphate, and urea, with or without supplemental materials.

When dissolved in water to form strong solutions, particularly solutions approximating concentrated solutions, constituting the aqueous phase, and admixed with biocidal toxicant concentrates containing biocidal toxicants dissolved in organic solvents and insoluble in said aqueous phase, or solutions of such biocidal toxicants in organic solvents wherein said latter solutions, constituting the oleaginous phase, are insoluble in said aqueous phase, unstable dispersions form which readily and promptly separate out in the form of layers. Efforts to emulsify such aqueous phases and such oleaginous phases by means of usual types of emulsifying agents used in the toxicant emulsion field have proved entirely unsatisfactory. Non-ionic emulsifiers of the type of the polyoxyethylene derivatives of lipophillic materials, for instance, polyethylene glycol ethers of sorbitan monostearate, polyethylene glycol ethers of sorbitan monooleate, alkyl phenoxy polyoxyethanols, iso-octyl phenol polyoxyethylene ethers, and the like, have been found to be ineffective since they are salted out by the strong electrolytes in the high concentrations used in liquid fertilizers solutions. Similarly, higher alkyl aryl sulfonates, such as alkali metal, ammonium, magnesium or calcium salts of dodecyl benzene sulfonate, and the like, have likewise been found to be entirely unsatisfactory, whether used in conjunction with the non-ionic emulsifiers of the type mentioned above or by themselves.

The problem of providing satisfactory emulsions of aqueous liquid fertilizer solutions, particularly strong solutions, containing upwards of 20% of water-soluble fertilizer ingredients such as the monovalent and polyvalent ionic compounds described above and up to saturated aqueous solutions of said fertilizer solutions, with water-insoluble organic solvent-soluble biocidal toxicants has, so far as I am aware, not remotely been solved by others despite intensive efforts to do so. In certain instances, by means of special combinations of ingredients, it has been possible to prepare liquid fertilizer-biocidal toxicant compositions, but these must be prepared immediately prior to being used and must be used promptly since, among other things, their stability is of extremely short duration. Other special combinations of ingredients have been suggested, for instance, which are of use in liquid fertilizer-biocidal toxicant compositions but only if the liquid fertilizer contains trivalent phosphate ions and urea. In the presence of monovalent ions such as chlorides or nitrates, such latter compositions are of no commercial value because the emulsifying action of the combination of ingredients is destroyed.

I have discovered new and useful biocidal toxicant concentrates (and dispersant compositions for use therein) which, when admixed, by simple mixing, with liquid fertilizer compositions in the form of strong aqueous solutions, say in excess of 20% concentration up to saturation, product homogeneous emulsions or dispersions which remain usable for periods of the order of at least several hours. My invention makes it unnecessary to pre-mix the biocidal toxicant concentrate with water just prior to admixing it with the liquid fertilizer solution, as is required with certain heretofore known biocidal toxicant concentrates. All that is necessary, in the case of biocidal toxicant concentrates made in accordance with my invention, is simple mixing or agitation with the liquid fertilizer solution. Moreover, my novel biocidal toxicant concentrates can effectively be used with liquid fertilizer compositions irrespective of whether the latter contain monovalent or polyvalent ions, and they are also usable with more dilute solutions of liquid fertilizers as, for instance, those containing of the order of 10 to 15% of solids. Thus, they have a universality of utility which is a most important practical consideration.

I have discovered that if there are utilized, in admixture, certain materials falling into two separate classes, and which are employed in certain ratios with respect to each other, all as is hereafter described in detail, a synergistic effect is obtained which brings about the entirely unpredictable and unexpected results which are achieved by my present invention.

The first of these ingredients, which, for convenience, may be called the (a) ingredient, comprises a compound which is an ethylene oxide or propylene oxide condensation product or adduct of a substituted phenol or bisphenol esterified with a sulfopolycarboxylic acid. The ethylene oxide is present in the molecule of the (a) ingredient in number up to 15 groups and most advantageously from 1 to 10 groups. Where propylene oxide is used in place of ethylene oxide, the number of the propylene oxide groups should not exceed 10 and more advantageously should lie within the range of 1 to 2. Alternatively, the molecule of the (a) ingredient may contain both ethylene oxide and propylene oxide groups, as, for example, from 1 to 5 ethylene oxide or ethenoxy groups and from 5 to 1 propylene oxide or propenoxy groups.

The substituents in the phenol or bisphenol are selected from the group consisting of alkyl, phenyl and benzyl radicals. The total number of carbon atoms in the alkyl substituent or substituents should not be less than 8 nor more than 24 and there should be at least one alkyl radical having at least 5 carbon atoms.

The polycarboxylic acids, the sulfo-derivatives of which are employed in the preparation of the (*a*) ingredient, can be chosen from a large group, typical or illustrative examples of which are maleic acid, fumaric acid, tartaric acid, glutaconic acid, itaconic acid, adipic aicd, phthalic acid, sebacic acid, tricarballylic acid, and glutaric acid. Of particular utility are the aliphatic sulfopolycarboxylic acids, especially the water-soluble sulfodicarboxylic acids containing from 4 to 8 carbon atoms. The sulfosuccinic acid derivatives are particularly preferred.

The (*a*) ingredients are utilized, pursuant to my invention, in the form of certain classes of salts, all as is more particularly pointed out hereafter.

The (*a*) ingredient can, in general, be represented by the formula $$\underset{(R^1)_n\ \ R^2}{\overset{R}{Ar}}-(O-X)_w-O-CO-\underset{SO_3M'}{Y}(-COOM)_v$$

where A*r* is a radical selected from the group consisting of phenyl and bisphenyl, R is a member selected from the group consisting of alkyl radicals containing from 5 to 12 carbon atoms, phenyl and benzyl, $R^1$ is an alkyl radical containing at least 5 carbon atoms, $R^2$ is an alkyl radical containing from 1 to 3 carbon atoms, —O—X is an oxyalkylene radical selected from the group consisting of oxyethylene and oxypropylene, Y is the completely decarboxylated residue of a polycarboxylic acid containing from 4 to 8 carbon atoms, M is a member selected from the group consisting of an alkali metal and an organic substituted ammonium radical, M′ is an organic substituted ammonium radical, *n* is zero or 1, *w* is from 1 to 15 when —O—X is oxyethylene and from 2 to 10 when —O—X is oxypropylene, and *v* is 1 or 2, subject to the proviso that the total number of carbon atoms in the R alkyl radical plus the $R^1$ alkyl radical is not less than 8, and neither R nor $R^1$ contains more than 12 carbon atoms.

In a narrower and preferred aspect of my invention, the (*a*) ingredient can be represented by the formula

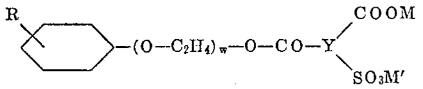

where R is an alkyl radical containing from 8 to 15 carbon atoms, Y is the completely decarboxylated residue of an aliphatic dicarboxylic acid containing from 4 to 8 carbon atoms, M and M′ are selected from the group consisting of alkali metals and organic substituted ammonium radicals with the proviso that at least one of them is an organic substituted ammonium radical, and *w* is from 1 to 3.

The alkyl radicals represented by R and R′ in the above formulae may be straight chain or branched chain and include, by way of illustration, amyl, hexyl, heptyl, octyl, nonyl, decyl, undecyl, dodecyl, 2-ethyl hexyl, 2-ethyl octyl, and the like, and they may be derived from fatty triglyceride or petroleum sources including kerosene fractions, and polymerized olefins such as polypropylenes as, for instance, propylene tetramers. The $R^2$ radical is represented by methyl, ethyl, propyl and isopropyl.

The salt-forming radicals represented by M and M′ comprise, in the case of M, alkali metals (which term is here used to mean sodium, potassium, lithium and ammonium); and, in the case of M and M′, organic substituted ammonium radicals. The latter, which most advantageously are water-soluble lower molecular weight amines, may be selected from a wide group, typical examples of which are dimethylamine; diethylamine; triethylamine; propylamine; monoisopropylamine, diisopropylamine, triisopropylamine, and commercial mixtures of said isopropylamines; butyl amine, amyl amine; monoisopropanolamine, diisopropanolamine, triisopropanolamine and commercial mixtures of said isopropanolamines; ethanolamines such as monoethanolamine, diethanolamine, triethanolamine, and commercial mixtures thereof; polyamines such as aminoethyl ethanolamine, ethylenediamine, diethylenetriamine, hydroxyethyl ethylenediamine, and hexamethylenediamine; hexylamine; cyclohexylamine; dimethylbenzylamine, benzylamine; morpholine; methylcyclohexylamine; alkyl alkanolamines such as ethyl diethanolamine and diethyl ethanolamine; furfurylamine; piperidine; 2-amino-2-methyl-1-propanol; 2-amino-1-butanol; methyl piperidine, and the like; as well as long chain amines such as octyl amine, dodecyl amine, hexadecyl amine, octadecyl amine, soya amines, soya-propyl amines, and the like; and compatible mixtures of any two or more thereof.

With reference to said first or (*a*) ingredient, it will be seen that, in the case of sulfodicarboxylic acid derivatives, the said salt may be the organic substituted ammonium di-salt, that is, where both M and M′ are organic substituted ammonium radicals, which may be the same or different organic substituted ammonium radicals; or the said salt may be a half alkali metal and half organic substituted ammonium salt which is the case where M is an alkali metal and M′ is an organic substituted ammonium radical. Of particular utility, as the first ingredient, are the organic substituted ammonium di-salts and the half ammonium half organic substituted ammonium salts of the sulfosuccinic acid esters of the ethylene oxide adduct of nonyl phenol with 1 to 3 ethenoxy groups, wherein the organic substituted ammonium radical is derived from an alkyl amine containing from 1 to 6 carbon atoms, especially isopropylamine. In the case of the sulfotricarboxylic acid derivatives, the said salt may be the organic substituted ammonium tri-salt, that is, where both M and M′ are organic substituted ammonium radicals, which may be the same or different organic substituted ammonium radicals; or the said salt may be a one-third alkali metal and two-thirds organic substituted ammonium salt, in which case M is an organic substituted ammonium radical and M′ is an alkali metal; or vice versa, that is, said salt may be a two-thirds alkali metal and one-third organic substituted ammonium salt, in which case M is an alkali metal and M′ is an organic substituted ammonium radical.

Illustrative examples of said (*a*) ingredient are the following (which include, also, the isomers thereof):

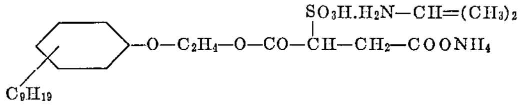

Half ammonium half isopropylamine salt of nonyl phenol mono-ethenoxy sulfosuccinate

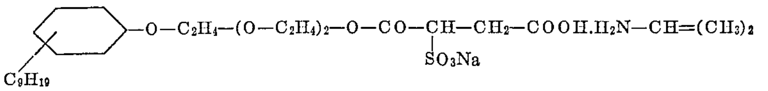

Half ammonium half isopropylamine salt of nonyl phenol tri-ethenoxy sulfosuccinate

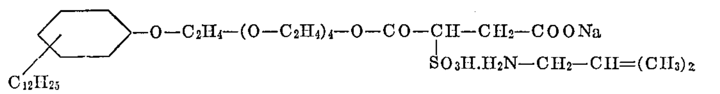

Half sodium half isobutylamine salt of dodecyl phenol penta-ethenoxy sulfosuccinate

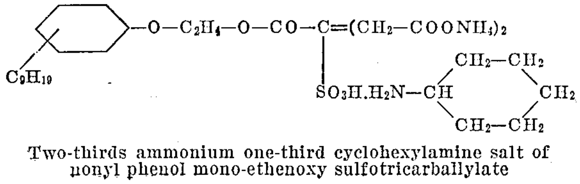

Two-thirds ammonium one-third cyclohexylamine salt of nonyl phenol mono-ethenoxy sulfotricarballylate

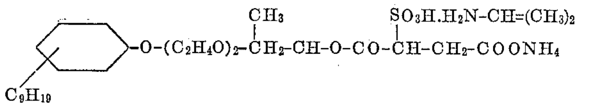

Half ammonium half isopropylamine salt of nonyl phenol di-ethoxy mono-propenoxy sulfosuccinate

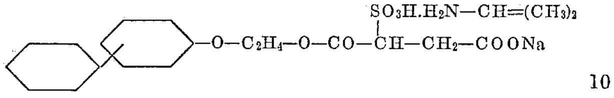

Half sodium half isopropylamine salt of phenyl phenol mono-ethenoxy sulfosuccinate

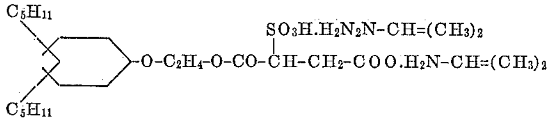

Di-isopropylamine salt of diamyl phenol mono-ethenoxy sulfosuccinate

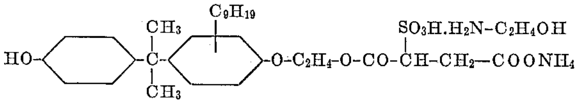

Half ammonium half monoethanolamine salt of nonyl bisphenol mono-ethenoxy sulfosuccinate

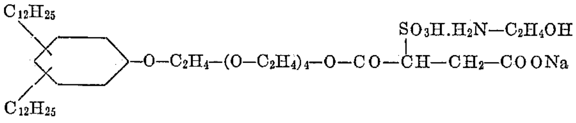

Half sodium half monoethanolamine salt of didodecyl phenol penta-ethenoxy sulfosuccinate The (a) compounds can be prepared by reacting an adduct of ethylene oxide, or propylene oxide, or mixtures thereof, as the case may be, of an alkyl phenol or bisphenol, for instance nonyl phenol. The resulting oxyalkylated (oxyethylated or oxypropylated) nonyl phenol can then be esterified with a sulfopolycarboxylic acid. This is advantageously done, in the case of the sulfosuccinic acid esters, by reacting the oxyalkylated nonyl phenol with maleic anhydride and then with an aqueous solution of a bisulfite salt. Illustrative examples of the preparation of typical compounds of the (a) group are set forth below:

*Example 1*

(a) 132 g. of an adduct of 1 mol of nonyl phenol and 1 mol of ethylene oxide are mixed with 51 g. of maleic anhydride and reacted for 2½ hours at 80 degrees C. whereby to form the maleic acid mono-ester of nonyl phenol mono-ethylene glycol mono-ether.

(b) A mixture is made of 55 g. ammonium bisulfite solution containing 412 millimols of $SO_2$, 416 millimols of $NH_3$, and 40.8 g. of water, to which are added 27.7 g. of water, 24.8 g. of isopropylamine and 65.2 g. of n-propanol, said mixture being preheated to 70 degrees C. There is slowly added thereto 146.4 g. of the nonyl phenol mono-ethylene glycol mono-ether produced in part (a) hereof. The reaction is exothermic and the reaction mixture therefore, is advantageously maintained for about ½ hour at 82–85 degrees C. by cooling. The reaction goes to about 97% of completion. The resulting compound, which is present in high concentration in the reaction mixture, is the isopropylamine-ammonium di-salt of the sulfosuccinic acid ester of nonyl phenol mono-ethylene glycol mono-ether. It may be utilized as such in the compositions of my present invention, or it may be recovered from the reaction mixture, purified if desired, although such is unnecessary, and then used in the compositions of my invention.

*Example 2*

(a) To 460 g. (1.16 mols) of an adduct of about 4 mols of ethylene oxide with 1 mol of nonyl phenol there are added, at about 125 degrees F., 98 g. (1.16 mols) of maleic anhydride and the resulting mixture is allowed to react for 48 hours at a temperature of 130–150 degerees F. The reaction product comprises essentially the maleic acid ester of the said ethylene oxide-nonyl phenol adduct.

(b) 64 g. (1 mol) of $SO_2$ are added to a solution of 117 g. of a technical blend of isopropyl aminoethanol and isopropyl aminodiethanol ("Amine 270"—Sharples Chemicals, Inc.) in 297 g. of n-propanol with 18 g. of water at about 100 degrees F. After all of the $SO_2$ is added, a second portion of a like amount of the aforesaid amines is added. The resulting amine sulfite solution is heated slowly to about 160 degrees F., and 574 g. of the reaction product of part (a) of this Example 2 are added over a period of about 1 hour, the temperature being allowed to rise to about 190 degrees F. The final product comprises the foregoing amine salts of the sulfosuccinic acid ester of the ethylene oxide-nonyl phenol adduct. It may be represented by the formula

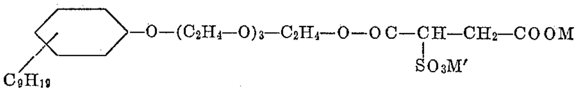

where M and M' are the cations of the aforementioned amines. The product, as prepared, is substantially anhydrous, containing about 0.4% free water.

The (a) ingredient is advantageously water-soluble or readily water-dispersible, although in its broader aspects it may be soluble in the organic solvents utilized in the production of the toxicant compositions contemplated by my invention.

The second of said ingredients, which may, for convenience, be called the (b) ingredient, is an amine salt of an alkyl benzene sulfonic acid in which the alkyl radical contains from 12 to 18 carbon atoms. The alkyl radical, which is advantageously predominately a single higher alkyl radical, may be derived from polypropylenes, kerosene fractions, or the like, contains predominately from 12 to 18 carbon atoms, and, especially, predominately from 12 to 15 carbon atoms. The benzene nucleus may also contain lower alkyl substituents, provided that the number of carbon atoms in such lower alkyl constituents is in the range of from 1 to 3 and the number of such lower alkyl substituents does not exceed 2. The number of sulfonic acid radicals in the benzene nucleus may be 1 or 2, but especially, there is only approximately one sulfonic acid radical in the benzene nucleus.

Certain of the higher alkyl benzene sulfonic acids which, in the form of their organic amine salts, are employed as the (b) ingredient in the practice of my invention can be represented by the formula

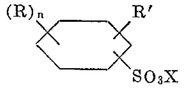

where R is a lower alkyl radical containing from 1 to 3 carbon atoms, such as methyl, ethyl, propyl and isopropyl, R' is a higher alkyl radical containing from 12 to 18 carbon atoms and especially from 12 to 15 carbon atoms, *n* is zero to 2, and X is an organic amine cation.

Typical examples of the organic amines whose salts of the higher alkyl benzene sulfonic acids are employed as the (b) ingredient in accordance with my present invention are those which have been mentioned above as being representative of M' in the general formula for the (a) ingredient. Particularly preferred are the alkyl amines containing from 1 to 6 carbon atoms and especially preferred is isopropyl amine. Typical or illustrative examples of the organic amine salts of the higher alkyl benzene sulfonic acids the use of which is encompassed by my invention are the following: diisopropanolamine salt of dodecyl benzene mono-sulfonic acid; isopropylamine salt of dodecyl benzene mono-sulfonic acid; diisopropylamine salt of dodecyl toluene mono-sulfonic acid; furfurylamine salt of pentadecyl benzene mono-sulfonic acid; cyclohexylamine salt of dodecyl mono-sulfonic acid; diisopropylamine salt of dodecyl isopropyl benzene sulfonic acid; morpholine salt of octadecyl benzene mono-sulfonic acid; and triisopropylamine salt of octadecyl benzene di-sulfonic acid; and mixtures of two or more thereof. The isopropylamine salt of dodecyl benzene mono-sulfonic acid is unusually satisfactory as the (b) ingredient and its use, in the combinations here involved, represents an important, though limited, embodiment of my invention.

It will be understood, of course, that mixtures of any two or more of the (a) and any two or more of the (b) ingredients can be employed in the practice of my present invention; and, also, that said (a) and (b) ingredients can be utilized in the form of impure reaction products containing high percentages of the active constituents thereof.

The biocidal toxicants which are used in accordance with my present invention and which, as stated above, comprise insecticides and soil fumigants, may be selected from a wide group typical examples of which are "Aldrin" (1,2,3,4,10,10 - hexachloro - 1,4,4a,5,8,8a - hexahydro-1,4,5,8 - dimethanonaphthalene); "Dieldrin" (1,2,3,4,10,10 - hexachloro - 6,7 - epoxy, 1,4,4a,5,6,7,8,8a-octahydroxy-1,4-endo-exo - 5,8 - dimethanonaphthalene); "Lindane" (gamma isomer of benzene hexachloride); "Heptachlor" (1,4,5,6,7,8,8-heptachloro - 3a,4,7,7a - tetrahydro-4,7-endo-methanoindene); "Nemagon" (1,2-dibromo-3-chloropropane); ethylene dibromide; DDT; organic thiocyanates such as B-butoxy, B'-thiocyanodiethyl ether; bornyl thiocyanoacetate; trichlorobenzene; propyl, butyl, and amyl ethers of pentachlorophenol, and the like, and compatible mixtures of any two or more thereof. Of especial importance are "Aldrin," "Dieldrin," "Lindane," "Heptachlor," and "Nemagon."

The organic solvent which is utilized in the preparation of the biocidal toxicant concentrates of my present invention, and in which the biocidal toxicant is soluble, may be selected from a known group of such organic solvents. Such organic solvents are of the type which are insoluble in the aqueous phase and, at least in most cases, will be per se insoluble in water. For convenience, said organic solvents are referred to herein as being "water-insoluble," and the same is true of the biocidal toxicants, although the criterion is essential insolubility in the aqueous phase of the emulsion. These include, for instance, aromatic hydrocarbon solvents, or blends thereof with paraffinic or naphthenic solvents. Examples of such solvents are kerosene; light refined mineral oil; methylnaphthalenes such as monomethyl naphthalene, dimethyl naphthalene and trimethyl naphthalene; ethyl naphthalene; 2-methylpentanediol-1,2; dipropylene glycol methyl ethers; benzene, toluene, aromatic naphthas, xylene, tetrahydronaphthalene, cyclohexane, and the like. These and various other organic solvents are frequently sold under trade names, such as "Cyclosol 53," which is an aromatic petroleum fraction comprising methylated naphthalenes; and "Sovacide 544C" which is an aromatic petroleum oil containing methylated naphthalenes.

The (a) and (b) ingredients are incorporated into solutions of the biocidal toxicants in the selected organic solvent or mixtures of organic solvents to produce biocidal toxicant concentrates. Typical of such biocidal toxicant concentrates are so-called concentrates containing, for instance, 2 pounds "Heptachlor" per gallon; 1.5 pounds "Dieldrin" per gallon; 1 pound gamma equivalent benzene hexachloride per gallon; and 45% "Nemagon" concentrates. The content of the total of the (a) and (b) ingredients, by weight of the biocidal toxicant concentrate, will fall within the range of 3 to 30%, but, ordinarily, from 6 to 15%, and, particularly, from 8 to 12%, will be found quite satisfactory for most purposes. The relative proportions of the (a) and (b) ingredients, or, in other words, the weight ratio of the (a) to the (b) ingredient, should be at least 2 to 1, and is usually in the range of about 2 to about 20, preferably on an average of about 4 to 10, parts of the (a) ingredient to 1 part of the (b) ingredient. The upper limit of the (a) ingredient may, if desired, be at least several times the values recited above. Within the limits stated, the proportions of ingredients may be varied in order to obtain optimum results in connection with any particular liquid fertilizer solution.

The percentages or proportions of the (a) and (b) ingredients, as set forth above, are predicated on their being pure substances. In actual commercial practice, the (a) and (b) ingredients as prepared will not be in pure form and, indeed, it is unnecessary that they be used in pure form. Thus, for instance, in the case of the (a) ingredient used in Example A, it may be prepared in the form of an approximately 50% or 60% to 65% or 75% active product, and the (b) ingredient used in Example A is commonly prepared in the form of an approximately 95% active product. In using such unpurified reaction mixtures comprising the (a) and (b) ingredients, account should be taken of the active ingredient content thereof in selecting the percentages thereof to be used.

The liquid fertilizer solutions (with which the hereinabove described biocidal toxicant concentrates are admixed to form homogeneous emulsions or dispersions which are usable over periods of at least several hours) are, per se, well known in the art. They comprise aqueous solutions, usually strong or concentrated aqueous solutions even up to saturation, of water-soluble compounds which fall into the categary of providing at least one of the elements potassium, nitrogen and phosporus, including, among others, as previously pointed out, potassium chloride, potassium nitrate, potassium sulphate, ammonium nitrate, ammonium sulphate, ammonium phosphate, aqueous ammonia, and the like, as well as organic water-soluble fertilizer materials particularly in conjunction with the inorganic water-soluble salts, such as those mentioned above, an especially preferred example of such organic water-soluble fertilizer material being urea. The liquid fertilizers, which will normally include one or more of the aforementioned materials, may be standardized as to their nitrogen, phosphorus (as $P_2O_5$) and potassium (as $K_2O$) contents. Typical examples of liquid fertilizer solutions, which can be used in conjunction with the novel biocidal toxicant concentrates of my invention are shown in a bulletin entitled, "Preparation of Liquid Fertilizers," Second Edition, published by Victor Chemical Works, Chicago, Illinois.

The following examples are illustrative of biocidal toxicant concentrates, and dispersant compositions for use therein, falling within the scope of my invention. Other specific embodiments will readily occur to those skilled in the art in the light of the guiding teachings and principles disclosed herein. All parts listed are by weight.

*Example A*

| | Parts |
|---|---|
| Dieldrin (99%) | 18 |
| Xylene | 72 |
| Isopropropylamine di-salt of nonyl phenol mono-ethenoxy sulfosuccinate (65% active) | 9 |
| Isopropylamine salt of dodecyl benzene sulfonic acid (95% active) | 1 |

*Example B*

| | |
|---|---|
| Dieldrin | 18 |
| Xylene | 72 |
| Isopropylamine di-salt of nonyl phenol tri-ethenoxy sulfosuccinate (65% active) | 8 |
| Isopropylamine salt of dodecyl benzene sulfonic acid (95% active) | 2 |

*Example C*

| | |
|---|---|
| "Heptachlor" | 32.5 |
| "Sovacide 544 C" | 57.5 |
| Isopropylamine tri-salt of the sulfotricarballylic acid ester of di-ethenoxy nonyl phenol | 7.5 |
| Isopropylamine salt of dodecyl benzene sulfonic acid | 2.5 |

*Example D*

| | |
|---|---|
| Half ammonium half isoprylamine salt of nonyl phenol monoethenoxy sulfosuccinate | 4 |
| Isopropylamine salt of dodecyl benzene sulfonic acid | 1 |

*Example E*

| | |
|---|---|
| Isopropylamine di-salt of nonyl phenol tri-ethenoxy sulfosuccinate | 4 |
| Isopropylamine salt of dodecyl benzene sulfonic acid | 1.5 |

*Example F*

| | |
|---|---|
| Isoproylamine di-salt of di-dodecyl phenol tri-ethenoxy sulfosuccinate | 10 |
| Isopropylamine salt of dodecyl benzene sulfonic acid | 2 |
| Kerosene | 53 |
| "Cyclosol 53" (organic solvent) | 35 |

The weight ratio between the oleaginous phase, represented by the toxicant concentrate, and the aqueous phase, represented by the strong or concentrated aqueous solution of fertilizer ingredients, can range from 1 to 1 or up to 1 to 10. However, in the usual case of the use of the biocidal toxicant concentrates of my present invention, the amount of the liquid fertilizer solution will be many times the amount of the biocidal toxicant concentrate. In other words, most commonly the aqueous phase of the emulsion will be present in large excess over the oleaginous phase present in the biocidal toxicant concentrate. While such excess may vary somewhat, in the usual case it will be in the range of about 25 or 30 to 60 or even more times that of the oleaginous phase, but will usually be from about 30 to 40 times that of the oleaginous phase, all in terms of parts by weight.

In the use of the biocidal toxicant concentrates of my invention, the same are simply admixed with the aqueous or liquid fertilizer solution, with suitable agitation. For instance, 2.5 parts of the toxicant concentrate of Example A are admixed, with stirring, with 97.5 parts of a standard liquid fertilizer solution (8–24–0 diammonium phosphate solution). In another typical example, 3 parts of the toxicant concentrate of Example B are admixed with 97 parts of a standard liquid fertilizer solution, Uran 32 (derived from ammonium nitrate and urea). Again, 3.3 parts of the toxicant concentrate of Example D are admixed with 96.7 parts of a liquid fertilizer solution made up of 44.3 parts ammonium nitrate, 35.4 parts urea, and 20.3 parts of water. Other illustrative commercial types of liquid fertilizer solutions with which my novel biocidal toxicant concentrates can be used are the so-called 8–8–8 (derived from ammonium phosphate, potassium chloride and urea), and 10–20–0 (derived from ammonium phosphate and urea).

The dispersant compositons of the present invention have unusual utility in connection with the production of toxicant concentrates for use in conjunction with aqueous solutions containing high concentrations of fertlizer ingredients, all as has been described above in detail. They have a broader utility, however, namely, in connection with the production of stable emulsions of oleaginous and aqueous materials in the presence of high concentrations of ionizable materials, notably inorganic salts. It is well known that the presence of ionizable materials such as sodium chloride, sodium sulfate, magnesium chloride, magnesium sulfate and other monovalent and polyvalent inorganic salts, in oleaginous-aqueous emulsion systems, very seriously affects the stabilities of such emulsions, especially where the concentrations of said salts in the aqueous phase is of the order of even a few percent. The dispersant compositions of this invention make possible the production of stable emulsions even under the highly adverse environmental conditions of high concentrations of strongly ionizable salts.

Where reference is made to water-insoluble biocidal toxicants, it will be understood that such is intended to encompass biocidal toxicants which are insoluble in water as well as biocidal toxicants which are insoluble in the liquid fertilizers per se irrespective of their solubility in water per se.

What I claim as new and desire to protect by Letters Patent of the United States is.

1. A dispersant composition, soluble in organic solvent solutions of water-insoluble biocidal toxicants, comprising (a) a compound represented by the formula

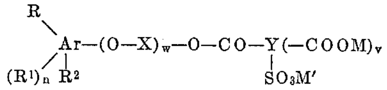

where Ar is a radical selected from the group consisting of phenyl and bisphenyl, R is a member selected from the group consisting of alkyl containing from 5 to 12 carbon atoms, phenyl and benzyl, $R^1$ is alkyl containing at least 5 carbon atoms, $R^2$ is alkyl containing from 1 to 3 carbon atoms, —O—X is an oxyalkylene radical selected from the group consisting of oxyethylene and oxypropylene, Y is the completely decarboxylated residue of a polycarboxylic acid containing from 4 to 8 carbon atoms, M is a member selected from the group consisting of an alkali metal and an organic substituted ammonium radical, M′ is an organic substituted ammonium radical, *n* is zero to 1, *w* is from 1 to 15 when —O—X is oxyethylene and from 2 to 10 when —O—X is oxypropylene, and *v* is 1 to 2, subject to the proviso that the total number of carbon atoms in the R alkyl plus the $R^1$ alkyl is not less than 8, and neither R nor $R^1$ contains more than 12 carbon atoms, and (b) an amine salt of an alkyl benzene sulfonic acid in which the alkyl contains from 12 to 18 carbon atoms, the weight ratio of said (a) to said (b) ingredient being at least 2 to 1.

2. A dispersant composition, soluble in organic solvent solutions of organic water-insoluble biocidal toxicants, comprising (a) a compound represented by the formula

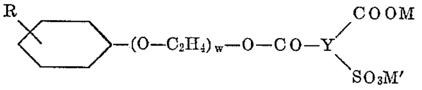

where R is alkyl containing from 8 to 15 carbon atoms, Y is the completely decarboxylated residue of an aliphatic dicarboxylic acid containing from 4 to 8 carbon atoms, M and M′ are selected from the group consisting of alkali metals and organic substituted ammonium radicals with the proviso that at least one of them is an organic substituted ammonium radical, and *w* is from 1 to 3, and (b) an alkyl amine salt of an alkyl benzene sulfonic acid corresponding to the formula

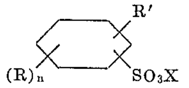

where R is lower alkyl containing from 1 to 3 carbon atoms, R′ is higher alkyl containing from 12 to 18 carbon atoms, *n* is zero to 2, and X is an organic amine cation, the weight ratio of said (a) to said (b) ingredient being at least 2 to 1.

3. A dispersant composition, soluble in organic solvent solutions of organic water-insoluble biocidal toxicants, comprising (a) an organic substituted ammonium di-salt of a sulfosuccinic acid ester of an ethylene oxide adduct of nonyl phenol, said adduct containing from 1 to 3 oxyethylene groups, and (b) an amine salt of dodecyl benzene sulfonic acid, the weight ratio of said (a) to said (b) ingredient being at least 2 to 1.

4. A dispersant composition, soluble in organic solvent solutions of organic water-insoluble biocidal toxicants, comprising (a) an organic substituted ammonium di-salt of a sulfosuccinic acid ester of an ethylene oxide adduct of di-amyl phenol, said adduct containing from 1 to 3 oxyethylene groups, and (b) an amine salt of dodecyl benzene sulfonic acid, the weight ratio of said (a) to said (b) ingredient being at least 2 to 1.

5. A dispersant composition, soluble in organic solvent solutions of organic water-insoluble biocidal toxicants, comprising (a) an organic substituted ammonium di-salt of a sulfosuccinic acid ester of an ethylene oxide adduct of di-dodecyl phenol, said adduct containing from 1 to 6 oxyethylene groups, and (b) an amine salt of dodecyl benzene sulfonic acid, the weight ratio of said (a) to said (b) ingredient being at least 2 to 1.

6. A dispersant composition, soluble in organic solvent solutions of organic water-insoluble biocidal toxicants, comprising (a) an organic substituted ammonium di-salt of a sulfosuccinic acid ester of an ethylene oxide adduct of an alkyl phenol in which there are from 1 to 2 alkyls and each alkyl contains from 5 to 12 carbon atoms, the total number of carbon atoms in said alkyl being at least 8, and (b) an amine salt of dodecyl benzene sulfonic acid in which the amine salt contains from 1 to 6 carbon atoms, the weight ratio of said (a) to said (b) ingredient being from 2 to 6 of (a) to 1 of (b).

7. A dispersant composition in accordance with claim 6, in which the amine salt in the (b) ingredient is the isopropylamine salt.

8. A toxicant concentrate comprising an organic solvent solution or an organic water-insoluble biocidal toxicant and containing, dissolved therein, (a) a compound represented by the formula

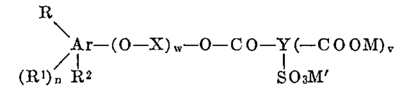

where Ar is a radical selected from the group consisting of phenyl and bisphenyl, R is a member selected from the group consisting of alkyl containing from 5 to 12 carbon atoms, phenyl and benzyl, $R^1$ is alkyl containing at least 5 carbon atoms, $R^2$ is alkyl containing from 1 to 3 carbon atoms, —O—X is an oxyalkylene radical selected from the group consisting of oxyethylene and oxypropylene, Y is the completely decarboxylated residue of a polycarboxylic acid containing from 4 to 8 carbon atoms, M is a member selected from the group consisting of an alkali metal and an organic substituted ammonium radical, M′ is an organic substituted ammonium radical, *n* is zero to 1, *w* is from 1 to 15 when —O—X is oxyethylene and from 2 to 10 when —O—X is oxypropylene, and *v* is 1 to 2, subject to the proviso that the total number of carbon atoms in the R alkyl plus the $R^1$ alkyl is not less than 8, and neither R nor $R^1$ contains more than 12 carbon atoms, and (b) an amine salt of an alkyl benzene sulfonic acid in which the alkyl contains from 12 to 18 carbon atoms, the weight ratio of said (a) to said (b) ingredient being at least 2 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

9. A toxicant concentrate comprising an organic solvent solution of an organic water-insoluble biocidal toxicant and containing, dissolved therein, (a) an organic substituted ammonium di-salt of a sulfosuccinic acid ester of an ethylene oxide adduct of an alkyl phenol in which there are from 1 to 2 alkyls and each alkyl contains from 5 to 12 carbon atoms, the total number of carbon atoms in said alkyl radicals being at least 8, and (b) an alkyl amine salt of an alkyl benzene sulfonic acid corresponding to the formula

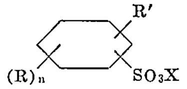

where R is lower alkyl containing from 1 to 3 carbon atoms, R′ is higher alkyl containing from 12 to 18 carbon atoms, *n* is zero to 2, and X is an organic amine cation, the weight ratio of said (a) to said (b) ingredient being from 2 to 6 of (a) to 1 of (b), the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

10. A toxicant concentrate in accordance with claim 9, wherein M and M′ are alkyl amines containing from 1 to 6 carbon atoms, the amine salt of the alkyl benzene sulfonic acid is an alkyl amine containing from 1 to 6 carbon atoms, and wherein the total of said (a) and (b) ingredients constitutes from 6 to 15%, by weight, of said concentrate.

11. A toxicant concentrate in accordance with claim 9, wherein M and M′ are isopropylamine, wherein the amine salt of the alkyl benzene sulfonic acid is isopropylamine, and wherein the total of said (a) and (b) ingredients constitutes from 6 to 15%, by weight, of said concentrate.

12. A toxicant concentrate comprising an organic solvent solution of an organic water-insoluble biocidal toxicant and containing, dissolved therein, (a) an organic substituted ammonium di-salt of a sulfosuccinic acid ester of an ethylene oxide adduct of nonyl phenol, said adduct containing from 1 to 3 oxyethylene groups, and (b) an alkyl amine salt of dodecyl benzene sulfonic acid, the alkyl amine radicals containing from 1 to 6 carbon atoms, the weight ratio of said (a) to said (b) ingredient being from about 2 to about 20 of (a) to 1 of (b), the total of said (a) and (b) ingredients constituting from 6 to 15%, by weight, of said concentrate, said concentrate being adapted, upon admixture with aqueous solutions containing upwards of 20% of fertilizer ingredients to form a homogeneous disperison usable for periods of the order of at least several hours.

13. A combination biocidal toxicant water-soluble inorganic salt fertilizer composition containing an aqueous phase comprising a water solution of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a compound represented by the formula

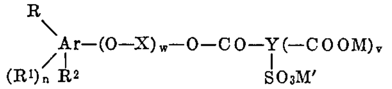

where Ar is a radical selected from the group consisting of phenyl and bisphenyl, R is a member selected from the group consisting of alkyl containing from 5 to 12 carbon atoms, phenyl and benzyl, $R^1$ is alkyl containing at least 5 carbon atoms, $R^2$ is alkyl containing from 1 to 3 carbon atoms, —O—X is an oxyalkylene radical selected from the group consisting of oxyethylene and oxypropylene, Y is the completely decarboxylated residue of a polycarboxylic acid containing from 4 to 8 carbon atoms, M is a member selected from the group consisting of an alkali metal and an organic substituted ammonium radical, M′ is an organic substituted ammonium radical, *n* is zero to 1, *w* is from 1 to 15 when —O—X is oxyethylene and from 2 to 10 when —O—X is oxypropylene, and *v* is 1 to 2, subject to the proviso that the total number of carbon atoms in the R alkyl plus the $R^1$ alkyl is not less than 8, and neither R nor $R^1$ contains more than 12 carbon atoms, and (b) an amine salt of an alkyl benzene sulfonic acid in which the alkyl contains from 12 to 18 carbon atoms, the weight ratio of said (a) to said (b) ingredient being at least 2 to 1, the total of said (a) and (b) ingredients constituting from 3 to 30%, by weight, of the water-immiscible oleaginous phase.

14. A combination biocidal toxicant water-soluble inorganic salt fertilizer composition containing an aqueous phase comprising a water solution of at least 20% of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) an organic substituted ammonium di-salt of a sulfosuccinic acid ester of an ethylene oxide adduct of an alkyl phenol in which there are from 1 to 2 alkyls and each alkyl contains from 5 to 12 carbon atoms, the total number of carbon atoms in said alkyl being at least 8, and (b) an alkyl amine salt of an alkyl benzene sulfonic acid corresponding to the formula

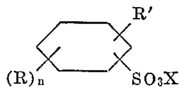

where R is lower alkyl containing from 1 to 3 carbon atoms, R' is higher alkyl containing from 12 to 18 carbon atoms, $n$ is zero to 2, and X is an organic amine cation, the weight ratio of said (a) to said (b) ingredient being from 2 to 6 of (a) to 1 of (b), the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

References Cited by the Examiner

UNITED STATES PATENTS

| | | | |
|---|---|---|---|
| 2,558,762 | 7/1951 | Kohr | 71—2.6 |
| 2,679,526 | 5/1954 | De Groote | 260—481 |
| 2,731,338 | 1/1956 | Fike | 71—2.6 |
| 2,770,538 | 11/1956 | Vierling | 71—1 |
| 2,898,267 | 8/1959 | Lindner | 167—42 |
| 2,976,208 | 3/1961 | Lindner | 167—42 |
| 2,976,209 | 3/1961 | Lindner | 167—42 |
| 2,976,211 | 3/1961 | Lindner | 167—42 |
| 3,074,791 | 1/1963 | Scoles | 71—2.3 X |
| 3,080,280 | 3/1963 | Lindner | 167—42 |

LEWIS GOTTS, *Primary Examiner.*

M. A. BRINDISI, *Examiner.*